United States Patent [19]

Orr

[11] Patent Number: 4,620,873

[45] Date of Patent: Nov. 4, 1986

[54] ZINC-BASED PAINTS EMPLOYING A MIXTURE OF ETHER ALCOHOLS AS LIQUID ORGANIC VEHICLE

[75] Inventor: Edward W. Orr, Midland, Mich.

[73] Assignee: The Dow Chemical Company, Midland, Mich.

[21] Appl. No.: 778,957

[22] Filed: Sep. 23, 1985

Related U.S. Application Data

[63] Continuation-in-part of Ser. No. 745,454, Jun. 14, 1985.

[51] Int. Cl.$^4$ ................................................. C09D 5/08
[52] U.S. Cl. ................................ 106/1.17; 106/14.21; 106/14.39; 106/287.16; 427/383.7; 427/386; 427/387; 524/376; 524/439
[58] Field of Search ................. 106/1.17, 14.21, 14.39, 106/287.16; 427/383.7, 386, 387; 524/376, 439

[56] References Cited

U.S. PATENT DOCUMENTS

| | | | |
|---|---|---|---|
| 4,086,096 | 4/1978 | McLeod | 106/1.17 |
| 4,110,117 | 8/1978 | McLeod | 106/1.17 |
| 4,208,452 | 6/1980 | Keithler | 106/1.17 |
| 4,417,007 | 11/1983 | Salensky et al. | 523/442 |

OTHER PUBLICATIONS

Roebuck, E. H. et al., *Economics of Zinc Coating Systems for Corrosion Protection*, Journal of Protective Coatings and Linings, Jul. 1984, p. 38.
ASTM D 3359-78.
ASTM D 520-51.
ASTM G 53-77.
ASTM B 117-73.
ASTM D 1654-79.
Zinc Protective Coatings Conference, 11/10/81, The Ambassador West, Chicago, p. 7.

*Primary Examiner*—Lorenzo B. Hayes

[57] ABSTRACT

A solvent mix can be used to improve the protection offered by zinc-based paints. This method of improving zinc-based paints' protection affords an additional factor for the enhancement of coating protection.

36 Claims, No Drawings

ZINC-BASED PAINTS EMPLOYING A MIXTURE OF ETHER ALCOHOLS AS LIQUID ORGANIC VEHICLE

CROSS-REFERENCE TO RELATED APPLICATION

This is a continuation-in-part of copending application Ser. No. 745,454, filed June 14, 1985.

BACKGROUND OF THE INVENTION

This invention relates to zinc-based paints. More particularly, this invention relates to improving the corrosion resistance of zinc-based paints.

It has been estimated that a full 40 percent of steel production is to replace steel rendered useless by corrosion. David Pearce, *Zinc Protective Coatings Conference*, Nov. 10, 1981, page 7. The costs related to corrosion in the U.S. exceed seventy billion dollars annually. Roebuck, *Journal of Protective Coatings & Linings*, July 1984, p. 38.

It is well-known in the art how to make zinc-based paints. U.S. Pat. Nos. 4,086,096; 4,110,117 and 4,417,007 are hereby incorporated by reference to include some details as to the known manufacturing details of zinc-based paints.

It has been long sought to increase the protection offered by zinc-based paints. Many changes have been attempted and found successful. For example, U.S. Pat. No. 4,110,117 covers an enhancement of zinc paints by the addition of specified chromates, boron compounds, silicates and the like. David Litter Laboratories reports combining wet ground mica with the zinc particles improves the corrosion resistance of zinc-based paints. *American Paint & Coatings Journal*, July 16, 1973, pp. 54–63. There exists a need for further improvement in the corrosion protection offered by zinc-based paints.

SUMMARY OF THE INVENTION

In one aspect, the present invention is a zinc-based paint. This zinc-based paint formulation comprises:

(a) an amount of a zinc-containing particulate solid which is sufficient to increase the corrosion protection capacity of the paint;

(b) an amount of a binder which is sufficient to bind the paint to a corrodible substrate when the substrate is protectively coated with the paint; and (c) an amount of a liquid organic vehicle which is sufficient to disperse the particulate solids.

This vehicle contains a mixture comprising (1) a first ether alcohol of the formula $R-O-R^1-OH$ in which R is an alkyl moiety, and $R^1$ is an alkylene moiety; and (2) a second ether alcohol of the formula $R^2-O-R^3-OH$ in which $R^2$ is an alkyl moiety and $R^3$ is an alkylene moiety, said second ether alcohol being different from said first ether alcohol. The solvent mixture comprises the first and second ether alcohols in proportions sufficient to improve the corrosion resistance capacity of the paint compared to a paint using a solvent consisting of either one of the two ether alcohols.

In a second aspect, the invention is a coating comprising the zinc-based paint after the zinc-based paint formulation has been applied as a coating to a corrodible substrate and dried or cured.

In a third aspect, the invention is the resulting coated corrodible substrate.

The zinc-based paints of this invention are useful corrosion protectors on many substrates, partilarly those that rust or corrode such as steel, iron and galvanized surfaces.

DETAILED DESCRIPTION OF THE INVENTION

The zinc-containing particulate solid employed in the zinc-based paints of this invention is any particulate solid containing metallic zinc which can be suitably dispersed in a liquid organic vehicle containing a binder and applied to a corrodible substrate and thereby increase the resistance of the substrate to corrosion. Examples of preferred particulate solids include zinc dust having an average particle size smaller than about 100 micrometers, more preferably smaller than about 50 micrometers, and most preferably smaller than about 10 micrometers. The average particle size is generally preferred to be greater than about 2 micrometers and most preferably greater than about 4 micrometers. Of course, the zinc dust that is used conventionally has some zinc oxide on its surface. Relatively pure zinc dust is commercially available and it is preferred. Other zinc dusts that are available contain some copper, iron, lead or chromium. Such zinc dust is less preferred because it does provide a coating, from the coating composition, that has less protective action. When the metallic zinc in the coating composition is zinc flake, it is preferred that it has a particle size of less than about 300 mesh. The zinc flake is preferably a non-leafing type. It is flat and is made preferably by ball milling dust or powder of zinc or its alloy with metal higher than iron in the electromotive chemical series, such as aluminum and magnesium, in the presence of a lubricating and protective (against oxidation) solvent such as a higher boiling yet volatile aromatic solvent.

The binder used in the paint formulation of the present invention may be any one of a number of well-known resins conventionally employed for this purpose in the paint industry. The binder is suitably any dispersible material which will bind the resulting protective coating to a corrodible substrate. Generally, the binder will be chosen from one of four groups: (1) reactive binders such as epoxy resins derived from bisphenol A and epichlorohydrn which are hardened with polyamines such as polyaminoamides, diethylene triamine, triethylene tetramine or coal tar amines; (2) air drying binders such as those derived by reaction from diglycidyl ether of bisphenol A and vegetable oil fatty acids; (3) solvent-soluble binders which harden by solvent evaporation such as polyhydroxy ether of bisphenol A derived from bisphenol A and epichlorohydrin (phenoxy PKHH); and (4) binders conventionally employed in moisture-curable systems such as alkyl silicate prepared by hydroylsis or polymerization of tetraethyl silicate, alcohol and glycol. Other suitable binders include polyol silicates as described in U.S. Pat. No. 4,086,096, chlorinated rubber such as those prepared by chlorination of natural rubber in solution and the like. Of the foregoing binders, the epoxy resins and alkyl silicate are preferred, with epoxy resins being especially preferred.

The liquid organic vehicle comprises a mixture of at least two ether alcohols. Preferably, the mixture contains the ether alcohols in a weight ratio of one to the other which is less than about 10:1, more preferably less than about 5:1, even more preferably less than about 2.5:1, and most preferably less than about 1.5:1. Preferably, the first ether alcohol is represented by the formula R—O—R$^1$—OH and the second ether alcohol is represented by the formula R$^2$—O—R$^3$OH in which (1) R and R$^2$ are independently alkyl having from to 6 carbons and (2) R$^1$ and R$^3$ are independently alkylene moieties having at least 3 carbons, provided that the second ether alcohol differs from the first ether alcohol. More preferably, R$^1$ and R$^3$ independently contain more than 2 carbon atoms. Preferably, R$^1$ and R$^3$ independently contain fewer than 6 carbon atoms, more preferably fewer than 5 carbon atoms, even more preferably fewer than 4 carbon atoms. Most preferably, R$^1$ and R$^3$ each have 3 carbons. In an especially preferred mixture, R$^1$ and R$^3$ are 1,2-propylene. In more preferred mixtures, R and R$^2$ differ by at least 2 carbons, e.g., wherein R has 3 carbons and R$^2$ has one carbon. In most preferred mixtures, R is n-propyl and R$^2$ is methyl.

Especially preferred is a mixture of from about 2.5 to 1 weight parts of propylene glycol n-propyl ether (PGNPE) and from about 1 to about 2.5 weight parts of propylene glycol methyl ether (PGME). PGNPE and PGME each occur in two isomers, i.e., PGME as 1-methoxy-2-propanol and 2-methoxy-1-propanol, and PGNPE as 1-(n-propoxy)-2-propanol and 2-(n-propoxy)-1-propanol. The upper PGNPE weight ratio limit of isomers is preferably less than 20 weight parts of 1-(n-propoxy)-2-propanol to one weight part of 2-(n-propoxy)-1-propanol, more preferably less than 10:1, and most preferably less than 6:1. The lower PGNPE isomer weight ratio limit of 1-(n-propoxy)-2-propanol to 2-(n-propoxy)-1-propanol is preferably more than 1:1, more preferably greater an 2:1, most preferably about 5.7:1. PGME can comprise only 1-methoxy-2-propanol. If both isomers are present in significant amounts, the upper PGME weight ratio limit of 1-methoxy-2-propanol to 2-methoxy-1-propanol is preferably less than about 40:1, more preferably less than about 25:1, and in an especially preferable embodiment, the ratio is less than 22:1. The lower PGME isomer weight ratio limit is preferably more than 1:1, with a ratio more than 10:1 being more preferred and a ratio of 19:1 being most preferred.

In addition to the foregoing required components, the zinc-based paints of this invention optionally contain other ingredients commonly employed in conventional zinc-based paints such as other pigments, such as titanium dioxide, talc, lays, such as kaolin, and inhibitive copigments such as described in U.S. Pat. No. 4,086,096; color pigments or dyes, such as Monastral Green; reinforcing pigments; extenders; thixotropic agents; antisag agents such as pyrogenic silica, bentonite, montmorillonite; cathodically-active metals such as magnesium powder and aluminum powder, ferrous phosphide; and the like. Additional binders may be employed as well as dispersants and stabilizers; coating property enhancers such as Dow Corning Paint Additive Number 21, a 50 weight percent amino functional silicone monomer in n-butanol (Dow Corning, Midland, Mich. 48640) and water scavengers such as molecular sieves and Dow Corning Paint Additive Number 21.

The zinc-based paint of this invention is prepared by combining the aforementioned ingredients using procedures similar to those employed in preparing conventional zinc-based paint formulations. Such procedures are as further illustrated in the working examples.

To illustrate the reaction that occurs between the zinc-containing particulate solid and the liquid organic vehicle of this invention, the surfaces of pieces of zinc which have been immersed in various liquid organic solvent mixtures are dried and analyzed by X-ray photoelectron spectroscopy. The results show a change in the surface composition based on the liquid organic solvent used. The procedure is described and the results are discussed in more detail as follows.

Four slices 0.5 millimeters thick of a 99.99 weight percent pure zinc ingot are cut with a diamond wheel and polished flat with 600 grit aluminum oxide. The flat slices are rinsed with methylene chloride and air dried for one day.

The four dried slices are subjected to different treatments prior to analysis. The first slice is exposed to the atmosphere for 72 hours and is the control. The second slice is immersed in PGME (weight ratio of 1-methoxy-2-propanol to 2-methoxy-1-propanol is 19:1) for 72 hours. The third slice is immersed in PGNPE (weight ratio of 1-(n-propoxy)-2-propanol to 2-(n-propoxy)-1-propanol is 5.7:1) for 72 hours. The fourth slice is immersed in a weight blend of PGME to PGNPE of 1:1.5 (the isomer ratios of the components of PGME and PGNPE are the same as used in slice 2 and slice 3, respectively) for 72 hours. The fourth slice is the only slice immersed in a liquid organic vehicle of this invention. The immersion is in sealed glass containers.

After treating the slices for 72 hours, they are consecutively mounted in a stainless steel holder and analyzed as follows. The holder is placed into an X-ray photoelectron spectrometer. A hard vacuum ($10^{-9}$ to $10^{-10}$ torr) is then pulled in the X-ray photoelectron spectrometer over an interval of about 15 minutes. The slices finish drying while in the X-ray photoelectron spectrometer.

The X-ray photoelectron spectrometer is equipped with a tungsten-iridium filament, which is heated to generate thermal electrons. These thermal electrons are accelerated to a water-cooled magnesium anode by an accelerating voltage of 15,000 volts. The accelerated thermal electrons impact the magnesium anode generating K$\alpha$ X-rays, which have an energy of 1253.6 electron volts. These X-rays pass through a 2 micron aluminum window and impinge on the slice being analyzed. This impingement generates photoelectrons from the slice. These photoelectrons pass through a deaccelerating screen, are screened by a double pass cylindrical mirror filter and are detected by an electron multiplier.

Subracting the kinetic energy of a photoelectron from the energy of the impinging X-rays (1253.6 electron volts) leaves the binding energy of the photoelectron. From the distribution of the binding energy of the photoelectrons, non-hydrogen atoms on the surface can be detected and quantified. This technique measures atoms from the surface through atoms about 50 Å below the surface.

The analysis of all four slices detected zinc, oxygen, carbon and chlorine. The atomic percentages of the detected elements are shown in Table I.

TABLE I

| | %* Zinc | %* Oxygen | %* Carbon | %* Chlorine | %* Total |
|---|---|---|---|---|---|
| Slice 1[1] | 20.5 | 45.5 | 31.0 | 3.0 | 100.0 |
| Slice 2[2] | 18.9 | 39.4 | 39.0 | 2.7 | 100.0 |
| Slice 3[3] | 9.2 | 31.8 | 58.1 | 0.9 | 100.0 |
| Slice 4[4] | 26.8 | 39.6 | 30.6 | 3.0 | 100.0 |

*All percents are atomic percent
[1] air
[2] PGME
[3] PGNPE
[4] mixture

The percentage of zinc detected in the analysis of the four slices varies. Slice 4 (using a liquid organic vehicle of this invention) is the only slice to show an increase in the detected surface zinc relative to slice 1 (the control). Assuming that slice 4 (using a liquid organic vehicle of this invention) has an effect on the surface zinc detected equal to the weighted mass arithmetical average of the effects of slice 2 and slice 3 results in a predicted value of 13.1 atomic percent surface zinc. This predicted value is only 49 percent of the measured value.

An alternative analysis of the data in Table I is that the treatment of the zinc slice by PGME (slice 2) reduces the detected surface zinc by 7-8 percent. The treatment of the zinc slice by PGNPE (slice 3) reduces the detected surface zinc by 55.1 percent. Assuming again that slice 4 (using a liquid organic vehicle of this invention) has an effect on the surface zinc detected equal to the weighted mass arithmetical average of the effects of slice 2 and slice 3 results in a predicted value of 13.1 atomic percent zinc. This predicted value is again only 49 percent of the measured value.

Further analysis of the zinc 2p and Auger peaks indicates that all of the detected surface zinc is in the form of zinc oxide. Subtracting the oxygen contained in the zinc oxide leaves the residual surface oxygen. The normalized non-zinc oxide surface elements' atomic percentages are contained in Table II.

TABLE II

|  | %* Oxygen | %* Carbon | %* Chlorine | %* Total |
|---|---|---|---|---|
| Slice 1[1] | 42.4 | 52.5 | 5.1 | 100.0 |
| Slice 2[2] | 33.0 | 62.7 | 4.3 | 100.0 |
| Slice 3[3] | 27.7 | 71.2 | 1.1 | 100.0 |
| Slice 4[4] | 27.6 | 65.9 | 6.5 | 100.0 |

*All percents are atomic percent
[1] air
[2] PGME
[3] PGNPE
[4] mixture

Assuming that slice 4 (using a liquid organic vehicle of this invention) has an effect on the surface residual oxygen equal to the weighted mass arithmetical average of the effects of slice 2 and slice 3 results in a predicted value of 29.8 atomic percent residual oxygen. This predicted value is within 8 percent of the calculated value based on the measured data from slice 4 (using a liquid organic vehicle of this invention).

These measurements and calculations indicate that there is a significant reaction occurring involving the liquid organic vehicle of this invention and the surface of the zinc slice. This reaction does not occur when PGME (slice 2) or PGNPE (slice 3) are used individually as the solvent or when no solvent is used (slice 1).

This reaction may produce a greater amount of surface zinc oxide when compared with the use of no solvent or with a solvent which is not a liquid organic vehicle of this invention. This increased surface zinc oxide may cause the observed increased corrosion resistance capacity of zinc-based paints of this invention relative to the corrosion resistance capacity of the zinc-based paints not of this invention.

To confirm the purity of the zinc as measured by the X-ray photoelectron spectrometer, slice 1 (air) is argon sputtered to remove the top 100 Å of the zinc surface. Only zinc is detected on the newly created surface by the X-ray photoelectron spectrometer confirming that the purity of the zinc ingot used is sufficient not to affect the measured surface concentrations.

Thus, a reaction occurs involving the zinc-containing particulate solid and the liquid organic vehicle in the present zinc paint formulation as illustrated by the above data.

The zinc-containing particulate solid is employed in the paint formulation in an amount sufficient to provide the desired initial corrosion inhibition or resistance. Preferably, such amount is from about 50 to about 90 weight percent of the formulation, most preferably from about 70 to about 90 weight percent. The binder is employed in an amount sufficient to effectively bind the zinc-containing solid to the corrodible substrate. Preferably, the amount of binder used is from about 2 to about 10 weight percent of the formulation, most preferably from about 4 to about 7 weight percent. The liquid organic vehicle is employed in an amount to provide the desired fluidity so that the formulation can be applied as a coating to the desired substrate. Preferably, the vehicle is employed in an amount from about 5 to about 15 weight percent of the formulation, most preferably from about 9 to about 11 weight percent.

Substrates suitably coated in the practice of this invention include any that are subject to corrosion such as those of iron steel, including galvanized steel, copper, magnesium and other corrodible metals. Substrates of iron steel are especially preferred for use in the practice of this invention.

While the zinc-based paint formulations of the present invention can be applied to the substrate without prior treatment of the corrodible substrate, it is preferred to prepare the substrate by sand-blasting, shot-blasting or water-blasting prior to painting. It can also be applied to cold-rolled steel or pickled metal surfaces. More preferably, however, the corrodible substrate is prepared by sand-blasting. Most preferably, the corrodible substrate is prepared by low profile sand-blasting with fresh sand.

Low profile sand-blasting generates about a $1.27 \times 10^{-2}$ millimeter (mm) profile, while high or full profile sand-blasting generates about a $3.81 \times 10^{-2}$ mm profile. The zinc-based paint formulation is applied to the substrate in a conventional manner such as dipping, air or airless spraying, brushing, rollering and the like. Such formulation is applied as a coating at a thickness sufficient to measurably inhibit corrosion of the coated substrate, preferably a thickness in the range from about $6.4 \times 10^{-3}$ to about $410 \times 10^{-3}$ mm, most preferably from about $13 \times 10^{-3}$ to about $280 \times 10^{-3}$ mm. Preferably, the coating is thicker than the substrate profile.

The coating is dried under conditions sufficient to remove the liquid organic vehicle and to cure the binder. While the drying conditions will differ depending on the binder used, it is generally preferred to dry the coated substrate in air at temperatures from about $-20°$ C. to about $50°$ C., most preferably from about $10°$ C. to about $30°$ C.

Use of the present zinc-based paint produces a different coating from that produced by commercially available zinc-based paints. This difference is illustrated by the following test. Two steel substrates are painted, one with a commercial zinc-based paint, the other with the zinc-based paint of this invention. Subjecting both of the painted substrates to scanning electron microscopy and X-ray emission microspectroscopy revealed that the substrate painted with the zinc-based paint of this invention has statistically fewer large particles on the surface of the applied paint when compared with the surface of the commercial zinc-based paint. Similarily, the interparticle spaces had a different elemental analysis. These results are evidence of the chemical difference between the prior art zinc-based paint and the present zinc-based paint.

The following specific embodiments are described to further illustrate the practice of this invention and should not be construed as limiting its scope. Unless otherwise indicated, all parts and percentages are by weight.

In determining corrosion resistance of coated substrates, the corrosion protection capacity of a paint is measured by the following procedure. Bonderite 1000 cold-rolled steel test panels from Hooker Chemical are low profile sand-blasted, washed with acetone and vertically sprayed with either of the two formulated paints at 75°±3° F. (24°±2° C.) and 50±5 percent relative humidity. The sprayed test panels are horizontally dried at 75°±3° F. (24°±2° C.) and 50±5 percent relative humidity. The dried painted panel is evaluated according to ASTM D-1654-79 after the least protected test panel begins to corrode in a Salt Fog Cabinet (ASTM B-117-73) at a temperature of 95°±8° F. (35°±5° C.).

SPECIFIC EMBODIMENT 1

A batch of ZINC-LOCK TM 308 (trademark of The Porter Coatings Company) zinc-based three-component organic zinc primer is formulated with a 1.5 weight blend of PGNPE to PGME. The paint mix (1,328 g) is blended with 59.8 g of liquid organic vehicle. The PGME isomer ratio is 19:1 of 1-methoxy-2-propanol to 2-methoxy-1-propanol. The PGNPE isomer ratio is 5.7:1 of 1-(n-propoxy)-2-propanol to 2-(n-propoxy)-1-propanol. A second batch of ZINC-LOCK TM 308 brand primer is formulated with the usual ethylene glycol ethyl ether (EGEE) (comparison sample which is not an example of this invention). Separate Bonderite 1000 cold-rolled steel test panels from Hooker Chemical are low profile sand-blasted, washed with acetone and vertically sprayed with either the two formulated paints at 75°±3° F. (23°±2° C.) and 50±5 percent relative humidity. The paint is sprayed with a Graco Model 800 Air Spray Gun through a DeVilbis E tip using a 704 or 78 air cap. The pot pressure is 5-10 psig and the 1-quart pot is located at workpiece level. The sprayed test panels are horizontally dried at 75°±3° F. (23°±2° C.) and 50±5 percent relative humidity.

The painted test panels are comparatively tested for adhesion (ASTM 3359-78-B and the like). Both experimental and control panels will show similar results. The painted panels are subjected to Albert Singleton Corrosion Testing in a Salt Fog Cabinet (ASTM B-117-73) at 95°±8° F. (35°±5° C.) for a week and rated according to ASTM D-1654-79. The results will show a 7-point improvement on the 10-point ASTM D-1654-79 test scale. The panels are alternatively subjected to a Weatherometer test (ASTM G-53-77) for 28 days and rated according to ASTM D-1654-79. The Weatherometer test is run with (1) 25 minutes condensation cooling cycle, power input setting is "high", thermostat setting is 4;

(2) ultraviolet cycle power input setting is "high", thermostat setting is 4.5; and (3) cycle time is 4 hours of condensation per 8 hours of ultraviolet light.

The results show a 6-point improvement on the 10-point scale of ASTM D-1654-79.

SPECIFIC EMBODIMENT 2

Specific Embodiment 1 is repeated with varying amounts of PGNPE relative to PGME. The results of the Albert Singleton Corrosion Testing shown in Table I indicate that a mixture of PGNE and PGME has improved corrosion resistance capacity when compared to a paint using a solvent composed of either alkane ether alcohol solvent alone. Note that higher ratings show more corrosion protection on this 10-point scale.

TABLE III

| Weight ratio PGNPE/PGME | ASTM D-1654-79 rating |
| --- | --- |
| 0 | 0 |
| ⅓ | 0 |
| 1 | 3 |
| 3 | 3 |
| ∞ | 0 |

The isomer ratios are the same as those of Specific Embodiment 1.

SPECIFIC EMBODIMENT 3

Specific Embodiment 1 is repeated using a fully sand-blasted angle iron substrate under environmental conditions to produce a 2.2 mil coating. The Salt Fog Cabinet (ASTM B-117-73) (600 hours' exposure) results are similar but show only a 2-point improvement on the 10-point scale of ASTM D-1654-79.

SPECIFIC EMBODIMENT 4

Specific Embodiment 3 is repeated using a ¼" hot-rolled steel substrate. The coating is 3.8 mils (0.096 mm) thick. The Salt Fog Cabinet (ASTM B-117-73) (1780 hours' exposure) results are similar showing a 5-point improvement on the 10-point scale of ASTM D-1654-79.

SPECIFIC EMBODIMENT 5

Specific Embodiment 1 is repeated using a coating formulation of 149.9 g of an epoxy resin composed of 9 percent methylisobutyl ketone, 16 percent xylene, 75 percent of a bisphenol A epoxy resin characterized by an average molecular weight of 1050 and an epoxide equivalent weight between 475 and 575, 9.4 g of Beetle 216-8 (Trademark of American Cyanamid Company), 60.6 g of xylene, 95.5 g of EGEE, 25.4 g of fumed silica (0.02 microns), 72.7 g of Epon V-15-X-70 (Trademark of Shell Chemical Company), 71.1 g of methylisobutyl ketone and 2,372.0 g of zinc dust (ASTM Spec. D-520, Type I). The EGEE is replaced with the liquid organic vehicle of this invention. The Salt Fog Cabinet (ASTM B-117-73) (696 hours' exposure) results show a 6-point comparative advantage on the 10-point scale of ASTM D-1654-79.

SPECIFIC EMBODIMENT 6

Specific Embodiment 3 is repeated using a coating formulation of Specific Embodiment 4. The Salt Fog Cabinet (ASTM B-117-73) (1107 hours' exposure) results show a 6-point comparative advantage on the 10-point scale of ASTM D-1654-79.

SPECIFIC EMBODIMENT 7

Specific Embodiment 1 is repeated with a coating formulation of 32.3 g of an epoxy resin composed of 9 percent methylisobutyl ketone, 16 percent xylene, 75 percent of a bisphenol A epoxy resin characterized by an average molecular weight of 1050 and an epoxide equivalent weight between 475 and 575, 70.6 g of nitropropane, 1.8 g of phthalocyanine green, 5.8 g of MPA 2000X (Trademark of NL Chemicals) 20.2 g of toluene, 8.1 g of EGEE, 36.4 g of Versamid 140 (Trademark of Henkel Corp.), 1.1 g of 2,4,6-tri(dimethylaminomethyl)-phenol, 23.8 g of isopropanol and 100 g of zinc dust (ASTM D-520-51) (4-10 microns). The EGEE is replaced with the alcohol mixture of this invention. The Salt Fog Cabinet (ASTM B-117-73) (820 hours' exposure) results show a 5-point comparative advantage on the 10-point scale of ASTM D-1654-79.

These specific embodiments show that the solvent mixture improves the corrosion protection of zinc-based paints under a wide variety of conditions.

What is claimed is:

1. A zinc-based paint formulation comprising:
   (a) an amount of a zinc-containing particulate solid which is sufficient to increase the corrosion protection capacity of the paint;
   (b) an amount of a binder which is sufficient to bind the paint to a corrodible substrate when the substrate is protectively coated with the paint; and
   (c) an amount of a liquid organic vehicle which is sufficient to disperse the particulate solids, said vehicle containing a mixture comprising:
      (1) a first ether alcohol represented by the formula R—O—$R^1$—OH in which R is an alkyl moiety and $R^1$ is an alkylene moiety; and
      (2) a second ether alcohol represented by the formula $R^2$—O—$R^3$—OH, in which $R^2$ is an alkyl moiety and $R^3$ is an alkylene moiety,
said second ether alcohol being different from said first ether alcohol, in which the mixture comprises the first and second ether alcohols in a proportion sufficient to improve the corrosion resistance capacity of the paint compared to a paint using a solvent consisting of either one of the two ether alcohols.

2. The zinc-based paint formulation of claim 1 in which the zinc-containing particulate solid comprises zinc dust having an average particle size between about 100 micrometers and about 2 micrometers.

3. The zinc-based paint formulation of claim 2 in which the zinc dust has an average particle size between about 10 micrometers and about 4 micrometers.

4. The zinc-based paint formulation of claim 1 in which the binder is a reactive binder.

5. The zinc-based paint formulation of claim 4 in which the reactive binder is an epoxy resin or alkyl silicate.

6. The zinc-based paint formulation of claim 5 in which the reactive binder is an epoxy resin.

7. The zinc-based paint formulation of claim 1 in which the mixture contains the ether alcohols in a weight ratio less than about 10:1.

8. The zinc-based paint formulation of claim 6 in which the mixture contains the ether alcohols in a weight ratio less than about 10:1.

9. The zinc-based paint formulation of claim 8 in which the mixture contains the ether alcohols in a weight ratio less than about 1.5:1.

10. The zinc-based paint formulation of claim 1 in which (1) $R^1$ and $R^3$ are independently alkylene moieties having between 2 and 6 carbons, and (2) R and $R^2$ are independently alkyl having from 1 to 6 carbons and differ by at least 2 carbons, provided that the second ether alcohol differs from the first ether alcohol.

11. The zinc-based paint formulation of claim 7 in which (1) $R^1$ and $R^3$ are independently alkylene moieties having betwen 2 and 6 carbons, and (2) R and $R^2$ are independently alkyl having from 1 to 6 carbons and differ by at least 2 carbons, provided that the second ether alcohol differs from the first ether alcohol.

12. The zinc-based paint formulation of claim 9 in which (1) $R^1$ and $R^3$ are independently alkylene moieties having between 2 and 6 carbons, and (2) R and $R^2$ are independently alkyl having from 1 to 6 carbons and differ by at least 2 carbons, provided that the second ether alcohol differs from the first ether alcohol.

13. The zinc-based paint formulation of claim 10 in which $R^1$ and $R^3$ each have 3 carbons.

14. The zinc-based paint formulation of claim 12 in which $R^1$ and $R^3$ each have 3 carbons.

15. The zinc-based paint formulation of claim 13 in which R is n-propyl and $R^2$ is methyl.

16. The zinc-based paint formulation of claim 14 in which R is n-propyl and $R^2$ is methyl.

17. The zinc-based paint formulation of claim 15 in which the mixture consists essentially of from about 2.5 to about 1 weight part of propylene glycol n-propyl ether and from about 2.5 to about 1 weight part of propylene glycol methyl ether.

18. The zinc-based paint formulation of claim 16 in which the mixture consists essentially of from about 2.5 to about 1 weight part of propylene glycol n-propyl ether and from about 2.5 to about 1 weight part of propylene glycol methyl ether.

19. The zinc-based paint formulation of claim 18 in which the propylene glycol n-propyl ether consists essentially of 1-(n-propoxy)-2-propanol and 2-(n-propoxy)-1-propanol in a weight ratio between about 20:1 and about 1:1 and the propylene glycol methyl ether consists essentially of 1-methoxy-2-propanol.

20. The zinc-based paint formulation of claim 19 in which the propylene glycol methyl ether consists essentially of 1-methoxy-2-propanol and 2-methoxy-1-propanol in a weight ratio between about 40:1 and about 1:1.

21. The zinc-based paint formulation of claim 20 in which the propylene glycol n-propyl ether consists essentially of 1-(n-propoxy)-2-propanol and 2-(n-propoxy)-1-propanol in a weight ratio between about 20:1 and about 1:1 and the propylene glycol methyl ether consists essentially of 1-methoxy-2-propanol and 2-methoxy-1-propanol in a weight ratio between about 25:1 and about 1:1.

22. The zinc-based paint formulation of claim 21 in which the weight ratio of 1-(n-propoxy)-2-propanol to 2-(n-propoxy)-1-propanol is between about 4:1 and about 2:1 and the weight ratio of 1-methoxy-2-propanol to 2-methoxy-1-propanol is between about 22:1 and 19:1.

23. The zinc-based paint formulation of claim 1 which comprises:
   (a) from about 50 to about 90 weight percent zinc-containing particulate solid;
   (b) from about 4 to about 7 weight percent binder; and
   (c) from about 5 to about 15 weight percent liquid organic vehicle.

24. The zinc-based paint formulation of claim 21 which comprises (a) from about 50 to about 90 weight percent zinc-containing particulate solid;

(b) from about 4 to about 7 weight percent binder; and (c) from about 5 to about 15 weight percent liquid organic vehicle.

25. A coating produced by applying the zinc-based paint formulation of claim 1 to a corrodible substrate and drying or curing the painted corrodible substrate.

26. The coated corrodible substrate of claim 25.

27. A coating produced by applying the zinc-based paint formulation of claim 4 to a corrodible substrate and drying or curing the painted corrodible substrate.

28. A coating produced by applying the zinc-based paint formulation of claim 6 to a corrodible substrate and drying or curing the painted corrodible substrate.

29. A coating produced by applying the zinc-based paint formulation of claim 15 to a corrodible substrate and drying or curing the painted corrodible substrate.

30. A coating produced by applying the zinc-based paint formulation of claim 22 to a corrodible substrate and drying or curing the painted corrodible substrate.

31. A coating produced by applying the zinc-based paint formulation of claim 24 to a corrodible substrate and drying or curing the painted corrodible substrate.

32. The coated corrodible substrate of claim 27.
33. The coated corrodible substrate of claim 28.
34. The coated corrodible substrate of claim 29.
35. The coated corrodible substrate of claim 30.
36. The coated corrodible substrate of claim 31.

* * * * *